United States Patent [19]

Klüpfel et al.

[11] Patent Number: 4,648,646
[45] Date of Patent: Mar. 10, 1987

[54] DEVICE FOR GRIPPING AND PLACING MEMBERS

[75] Inventors: Olaf Klüpfel, Eickhorst; Walter S. Frielinghaus, Beckum; Erhard Scholz, Drensteinfurt, all of Fed. Rep. of Germany

[73] Assignee: Möllers Maschinenfabrik GmbH

[21] Appl. No.: 793,650

[22] Filed: Oct. 31, 1985

[30] Foreign Application Priority Data

Nov. 9, 1984 [DE] Fed. Rep. of Germany ....... 3440954

[51] Int. Cl.⁴ ............................ B66C 1/66; B66C 1/06
[52] U.S. Cl. .................................... 294/106; 294/119.1
[58] Field of Search .................. 294/119.1, 106, 103.1, 294/67.3, 67.31, 67.32, 67.33; 212/21; 414/733, 732, 785

[56] References Cited

U.S. PATENT DOCUMENTS 4,252,358 2/1981 Klebs ................................ 294/119.1

FOREIGN PATENT DOCUMENTS 2370671 11/1976 France ................................ 294/106
271767 3/1969 U.S.S.R. ............................ 294/106

OTHER PUBLICATIONS

Brochure-"Materialfluss" Jun. 1984, p. 17, Nütro Maschinenbau GmbH, Nurenburg, Fuji-Nütro Handling Roboter ACE.
Brochure-"Materialfluss" Jun. 1984, Beumer Maschinenfabrik KG, Beckum, Robotpac-Der Universal-Palettiererautomat.

Primary Examiner—James B. Marbert
Attorney, Agent, or Firm—Toren, McGeady and Goldberg

[57] ABSTRACT

A device for gripping, lifting and releasing a member, such as a package or individual article, used in automatic handling apparatus where two gripping arms are pivotally mounted so that they can be pivoted into and out of gripping relation with a member. The device can grip the member and place it carefully on a surface where it is surrounded laterally by similar members. In the placing operation the member gripped and the laterally surrounding members are not deformed. The gripping arms are pivoted at one end and grip the member at the other. The pivoted ends of the gripping arms can be moved away from or toward one another while being pivoted for effecting gripping or releasing of the member.

11 Claims, 3 Drawing Figures

DEVICE FOR GRIPPING AND PLACING MEMBERS

BACKGROUND OF THE INVENTION

The present invention is directed to a device for gripping and placing members, such as packages or individual articles, used in automatic handling apparatus, and include gripping arms which are pivotally mounted at one end and grip the member at the other. The pivoted ends can be moved toward and away from one another for effecting gripping engagement with or release of a member.

Known devices of this type, see the brochure of the firm Nütro Maschinenbau GmbH, Nuremburg, "Fuji-Nötro Handling-Roboter ACE" where form-locking gripping of a member is effected with the member being gripped on its lower surface, avoid the disadvantages of devices which hold a member in a locking manner by engagement with the upper surface only, for example, by means of pneumatic suction grippers. Where the member is gripped only on its upper side there are the disadvantages that the member can be considerably deformed when lifted and due to such deformation result in stacks of such members being of an inferior quality. Moreover, devices which only grip from above in a force-locking manner make special demands on the quality of the packaging material, for example, cement bags. Such packaging material should be of adequate strength, the material must not be porous and it must have a sufficiently smooth surface whereby the pneumatic suction equipment can be applied. Further, grippers which work in a form-locking manner are also known which have gripping arms for receiving a member between them and such arms are movable in opposite directions relative to one another, note the brochure of the firm Beumer Maschinenfabrik KG, Beckum, "Robotpac- Der Universal-Palettiererautomat".

In both of the devices mentioned above which work in a form-locking manner, there is the disadvantage that they do not permit placement of the member on a surface where it is laterally enclosed on all sides, that is, placement of the member in a space laterally enclosed by similarly placed members.

SUMMARY OF THE INVENTION

Therefore, it is the primary object of the present invention to provide a device of the general type mentioned above where the member is gripped in a form-locking manner and where it is possible to deposit or place the member on a surface where it is laterally surrounded by similar previously placed members so that there is no damage or deformation of the member placed or of the laterally arranged members.

A device of the type mentioned above, in accordance with the present invention, includes gripping arms which are pivoted at one end and are movable at the pivoted ends toward and away from one another for effecting the gripping of a member or the release of the gripping action. Due to this arrangement, when the gripping arms are opened for releasing a member, the arms can be flexibly moved apart after the member is placed on a surface between adjacent similar members previously placed whereby no damage or deformation occurs to the member just placed and the other laterally surrounding members.

It is particularly advantageous if the ends of the gripping arms which engage the member are curved inwardly toward the member so that the curved arrangement can be adapted to the member to be gripped in an optimum manner when the members being handled are identical, such as cement bags. Moreover, it is preferable that the pivotal movement of the gripping arms be effected in a specific determined manner during the gripping step, since a secure engagement with the member is ensured.

An especially simple arrangement is afforded when each of the gripping arms is biased by a force which displaces the arm into the open position, for example, where a spring force is used, so that each gripping arm is pressed against a guide element whereby the arm moves along the element into the closed or gripping position where it is in a substantially vertical position.

Furthermore, it is preferable to permit the pivotal movement of the gripping arms, when being moved into the open or released position, in an uncontrolled manner based on the configuration of the members being gripped, since a particularly careful placement of the member and displacement of the gripping arms for the release of the member can be effected.

In a preferred embodiment a stationary guide is provided for each gripping arm whereby the gripping arm rests against the stationary guide at the end of the opening or releasing movement aided by a biasing action which pivots the arm outwardly. At the outset of the releasing or opening movement of the arms, the pivotally mounted ends of the arms move toward one another and the arm though spring-biased toward the stationary guide can be displaced out of engagement with the member without contacting the stationary guide. The ends of the gripping arms which hold the member can engage the adjacent members located around the placed member until the curved ends of the gripping arms are pivoted outwardly from between the adjacent members.

In a preferred arrangement, the gripping arm can be moved away from or toward one another along the same guide rails.

The gripping arms can be formed at the gripping ends by teeth or similar members, however, the gripping ends can also be formed from continuous sheet metal sections or the like.

Moreover, the gripping ends of the arms can be provided with teeth with a roller or rollers supported between the teeth for reducing the friction forces occurring between the gripping arms and the members to be gripped.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
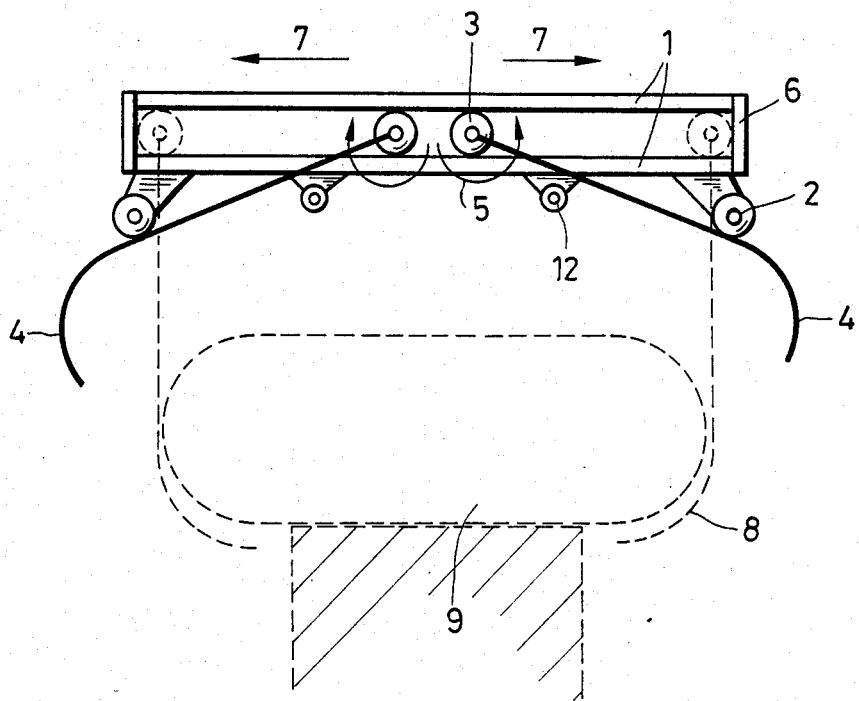
FIG. 1 is a schematic elevational view of a device embodying the present invention with the gripping arms of the device illustrated in the open or released position in solid line and in the closed or gripping position in dashed lines.

The device, shown schematically in FIG. 1, has a pair of vertically spaced parallel guide rails 1 with lateral stops 6 located at the opposite ends of the guide rails. A pair of rollers 3 are positioned between the guide rails 1 so that the rollers can be displaced along the guide rails between the positions shown in solid line and in dashed line. The rollers 3 are movable along the rails in a manner not otherwise shown. The movement of the rollers can be effected in a variety of well known ways. The roller axles, arranged in the rollers, are not shown in detail, and a gripping arm 4 is rigidly secured to the axle so that the axle and the gripping arm rotate as a unit. Each axle is biased by a spring member 5 with the biasing action indicated by the arrows so that the arms 4 are spring biased in opposite directions into the open or released position, as shown in FIG. 1. The spring members 5 hold the gripping arms 4 in the open position.

At the opposite ends of the guide rails 1, below the stops 6, guide rollers 2 are arranged. The gripping arms 4 contact the guide rollers 2 under the biasing action of the spring members 5 which are shown in the open position in solid lines in FIG. 1.

Inwardly from the guide rollers 2, additional guide rollers 12 are secured to and extend downwardly from the guide rails 1. The function of the additional guide rollers 12 will be discussed in more detail below. As can be seen, each guide roller 12 is associated with a different one of the gripping arms 4.

The device operates in the following manner: From the position of the rollers 3 and the gripping arms 4, shown in solid lines in FIG. 1, the rollers along with the roller axles and the gripping arms secured to the axles so they rotate with them, are moved apart along the guide rails 1 away from one another in the direction of the arrows 7. As the rollers 3 and axles move toward the stops 6 the gripping arms 4 each in contact with the rollers 2 move from the oblique position shown in solid lines in FIG. 1 into a vertical position with the lower ends of the gripping arms extending under the opposite ends of the member 9 in the form of a sack or bag. In the position shown in dashed lines the gripping arms engage the opposite ends of the member 9 so it can be lifted and moved to another location. After the gripping arms 4 have been moved into the closed or gripping position, the device is raised and moved from the position shown in FIG. 1 to another position where the member 9 is to be placed.

Figure 2:
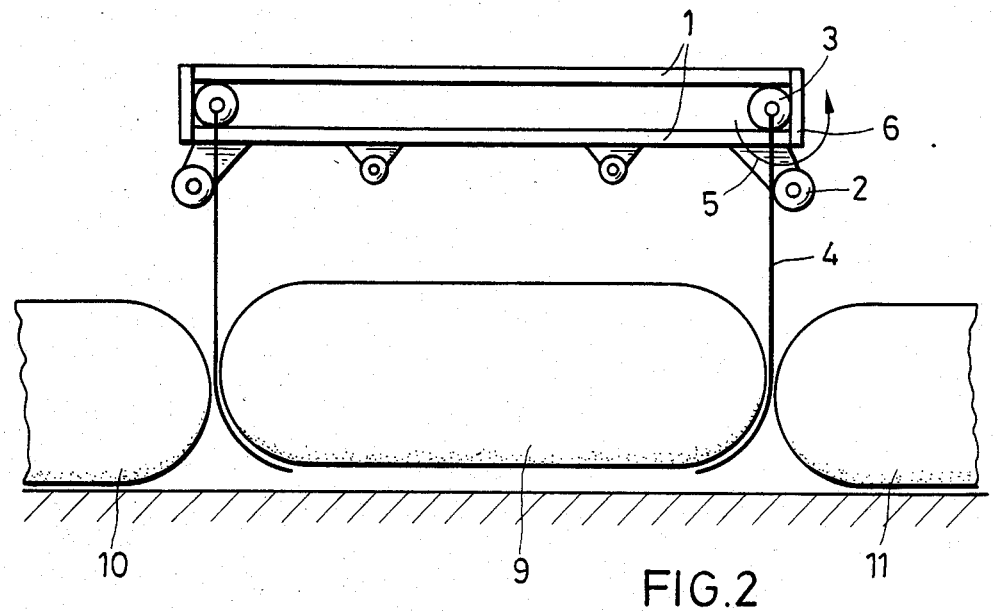
FIG. 2 is a view, similar to FIG. 1, illustrating the placement of a gripped member between similar previously placed members.
Figure 3:
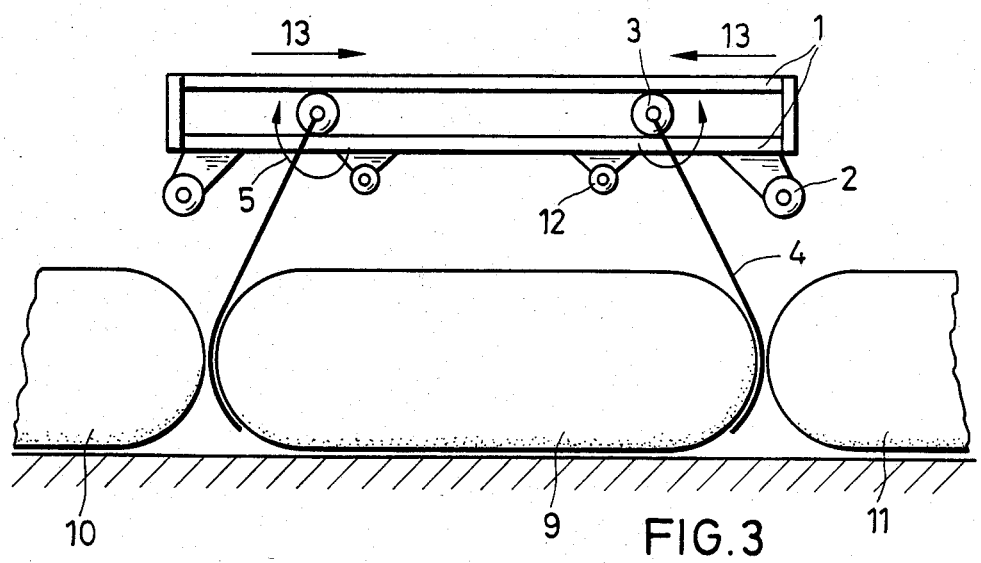
FIG. 3 is a view similar to FIG. 2 displaying the movement of the gripping arms during the release of the member placed in FIG. 2.

In FIG. 2 the device is shown in the position into which it has been moved ready to place the member 9 on a surface between a pair of adjacent members 10 and 11 previously placed on the same surface. The members 9, 10 and 11 are all of the same type. To effect the release of the gripping arms 4 from the member 9, the rollers 3 are moved inwardly along the guide rails 1 toward one another as is shown by the arrows 13 in FIG. 3 If the previously placed members 10 and 11 were not in the position shown in FIG. 3 the gripping arms 4 would be displaced upwardly by the biasing action of the spring members 5 remaining in contact with the guide rollers 2 as the rollers 3 move toward one another along the guide rails 1. Due to the position of the previously placed members 10 and 11, however, because of the shape of the gripping ends of the arms 4 as the rollers 3 move toward one another, the gripping ends of the arms are carefully and gently displaced from between the placed member 9 and the adjacent members 10 and 11 until the gripping ends are released and return to the position as shown in FIG. 1. As the gripping arms 4 are displaced into the open or release position, the arms are biased by the spring members 5 and avoid any possible jamming of the arms between the placed member 9 and the previously deposited members 10, 11 located laterally from it. Toward the end of the opening or releasing operation, a positive displacement of the gripping arms 4 is effected, if necessary, by means of the preferably laterally adjustable additional guide rollers 12.

It can be appreciated that the embodiment illustrated in the drawing and described above can be varied in a number of ways within the basic concept of the invention. For example, the gripping arms can be formed as continuous sheet metal sections or as rows of gripping arm teeth or tines. Further, the gripping arms can be provided with one or more rollers between the ends of the gripping teeth to reduce the friction forces between the gripping teeth and the members being gripped, particularly during the opening or releasing process of the gripping arms. The application of force to the gripping arms can be effected in other ways, as required, based on the operation to be performed.

While specific embodiments of the invention have been shown and described in detail to illustrate the application of the inventive principles, it will be understood that the invention may be embodied otherwise without departing from such principles.

We claim:

1. Device for gripping, lifting and releasing a member such as a package or individual article and used in automatic handling apparatus, comprising at least a pair of gripping arms each having a first end and a second end, said gripping arms being pivotally displaceable, means engageable with said gripping arms and arranged for moving the second ends thereof into and out of gripping relation with a member, wherein the improvement comprises that the seconds ends of said gripping arms are arranged to grip the underside of the member to be lifted, said means are arranged to support the first ends of said gripping arms for movement generally horizontally and during such generally horizontal movement for displacing said gripping arms between a gripping position where said gripping arms depending generally vertically from the first end thereof and a released or open position where said gripping arms extend obliquely relative to the vertical and out of engagement with the member each said gripping arm has a pivot axis at the first end thereof, and said means are arranged to move said gripping arms between the gripping and released positions by pivoting the first ends of said arms about the pivot axis thereof and at the same time for moving the first ends of said gripping arms away from or toward one another so that the second ends of said gripping arms move into or out of gripping engagement with the member.

2. Device, as set forth in claim 1, wherein said gripping arms have the second ends thereof, arranged to grip the member, curved inwardly toward one another.

3. Device, as set forth in claim 1, wherein said means includes a guide member engageable with each said gripping arm so that as the first ends of said gripping arms move away from one another said gripping arms move along said guide members into the gripping position.

4. Device, as set forth in claim 3, wherein said means includes a spring member in engagement with each said gripping arm for biasing said gripping arm against said guide member.

5. Device, as set forth in claim 4, wherein the second ends of said gripping arms are shaped in accordance with the configuration of the member to be gripped and lifted so that said second ends can be displaced from gripping engagement in the gripping position with one of the members when the member gripped is placed in a position adjacent to a number of similar members without displacing the adjacent members.

6. Device, as set forth in claim 5, wherein said means includes a stationary guide associated with each of said gripping arms and said stationary guide arranged to engage said gripping arm at the end of the displacement of the gripping arm into the open position for assuring the displacement of the gripping arm into contact with said guide element, and said stationary guide being positioned laterally inwardly from said guide member.

7. Device, as set forth in claim 1, wherein said means comprises a pair of horizontally arranged guide rails, a roller located between said guide rails for each said gripping arm so that said roller is displaceable horizontally along said guide rails, each said roller having an axle forming said pivot axis with the associated said gripping arm rigidly secured thereto so that said axle and gripping arm rotate as a unit, whereby as said rollers move along said guide rails away from one another said gripping arms are pivoted inwardly toward one another into the gripping position and as said rollers move along said rails toward one another said gripping arms are displaceable away from one another into the open or release position.

8. Device, as set forth in claim 1, wherein the second end of each said gripping arm is formed with a row of gripping teeth.

9. Device, as set forth in claim 1, wherein each said gripping arm is formed as a continuous sheet metal section.

10. Device, as set forth in claim 8, wherein at least one roller is located at the second end of said gripping arms between said gripping teeth.

11. Device, as set forth in claim 1, wherein said means comprises a pair of horizontally arranged guide rails disposed one above the other in parallel relation, a pair of rollers positioned between said guide rails and arranged to be displaced along said guide rails toward and away from one another, each said roller having an axle forming said pivotal axis, one said gripping arm secured to each said roller axle so that said gripping arm rotates with said axle as said roller moves between said guide rails, a guide roller secured to the opposite ends of the lower one of said guide rails, intermediate rollers mounted on the lower one of said rails with one said intermediate roller associated with each said gripping arm, spring means arranged to bias each said gripping arm into engagement with the associated said guide roller, and the second ends of said gripping arms being shaped to fit around and under the member to be gripped and lifted.

* * * * *